(12) United States Patent
Fisher

(10) Patent No.: US 11,361,295 B2
(45) Date of Patent: *Jun. 14, 2022

(54) BLAZE NFC MOBILE PAYMENTS

(71) Applicant: Michelle Fisher, Berkeley, CA (US)

(72) Inventor: Michelle Fisher, Berkeley, CA (US)

(73) Assignee: Michelle Fisher, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/363,973

(22) Filed: Jun. 30, 2021

(65) Prior Publication Data

US 2021/0326823 A1 Oct. 21, 2021

Related U.S. Application Data

(63) Continuation of application No. 17/084,538, filed on Oct. 29, 2020, which is a continuation of application
(Continued)

(51) Int. Cl.
*G06Q 20/20* (2012.01)
*H04W 4/21* (2018.01)
(Continued)

(52) U.S. Cl.
CPC ............ *G06Q 20/20* (2013.01); *G06Q 20/00* (2013.01); *G06Q 20/108* (2013.01); *G06Q 20/16* (2013.01); *G06Q 20/202* (2013.01); *G06Q 20/204* (2013.01); *G06Q 20/322* (2013.01); *G06Q 20/325* (2013.01); *G06Q 20/326* (2020.05); *G06Q 20/3223* (2013.01); *G06Q 20/3226* (2013.01); *G06Q 20/3227* (2013.01); *G06Q 20/3255* (2013.01); *G06Q 20/3278* (2013.01); *G06Q 20/3674* (2013.01);
(Continued)

(58) Field of Classification Search
CPC ............. G06Q 20/00–20; G06Q 20/32; G06Q 20/102; G06Q 20/105; G06Q 40/00–10; G06Q 99/00; G06K 5/00; G06K 7/08; G06K 7/10237; G06K 15/00
USPC ....... 455/41.1, 406–410, 556.1, 558; 705/16, 705/18, 30, 40, 41, 44, 64; 235/375–385, 235/451, 462, 492
See application file for complete search history.

(56) References Cited

U.S. PATENT DOCUMENTS 6,038,367 A 3/2000 Abecassis
6,101,483 A 8/2000 Petrovich
(Continued)

FOREIGN PATENT DOCUMENTS

EP 1503352 7/2004
WO WO 2006095212 A1 9/2006
WO WO 2007/129081 11/2007

OTHER PUBLICATIONS

"Room6_150pm_munro.pdf" at http://www.rfidjournal.net/live05/monday/.
(Continued)

*Primary Examiner* — Olusegun Goyea

(57) ABSTRACT

A method and system for receiving digital artifacts from a management server. The method includes sending a request for a digital artifact from a mobile application to the management server for display within a specific mobile application generated screen, receiving the digital artifact from the management server, and displaying the digital artifact with the specific mobile application generated screen.

30 Claims, 4 Drawing Sheets

Related U.S. Application Data

No. 14/253,648, filed on Apr. 15, 2014, now Pat. No. 10,825,007, which is a continuation of application No. 13/736,056, filed on Jan. 7, 2013, now Pat. No. 8,694,380, which is a continuation of application No. 11/948,903, filed on Nov. 30, 2007, now Pat. No. 8,352,323.

(51) Int. Cl.

| | | |
|---|---|---|
| *G06Q 30/02* | (2012.01) | |
| *G06Q 30/06* | (2012.01) | |
| *H04M 1/72445* | (2021.01) | |
| *G06Q 20/32* | (2012.01) | |
| *G06Q 20/38* | (2012.01) | |
| *G06Q 20/40* | (2012.01) | |
| *G06Q 20/36* | (2012.01) | |
| *G06Q 20/16* | (2012.01) | |
| *G06Q 20/00* | (2012.01) | |
| *G06Q 20/10* | (2012.01) | |
| *H04W 8/20* | (2009.01) | |
| *H04W 4/18* | (2009.01) | |
| *H04B 5/00* | (2006.01) | |
| *G06Q 40/00* | (2012.01) | |
| *H04W 4/80* | (2018.01) | |
| *H04W 4/029* | (2018.01) | |
| *H04N 21/81* | (2011.01) | |
| *G07F 7/10* | (2006.01) | |
| *H04W 88/02* | (2009.01) | |
| *H04W 4/02* | (2018.01) | |

(52) U.S. Cl.
CPC ....... *G06Q 20/382* (2013.01); *G06Q 20/3821* (2013.01); *G06Q 20/40* (2013.01); *G06Q 20/409* (2013.01); *G06Q 20/4012* (2013.01); *G06Q 20/4014* (2013.01); *G06Q 30/02* (2013.01); *G06Q 30/0222* (2013.01); *G06Q 30/0238* (2013.01); *G06Q 30/0251* (2013.01); *G06Q 30/0253* (2013.01); *G06Q 30/0255* (2013.01); *G06Q 30/0267* (2013.01); *G06Q 30/0268* (2013.01); *G06Q 30/06* (2013.01); *G06Q 30/0613* (2013.01); *G06Q 30/0635* (2013.01); *G06Q 40/10* (2013.01); *G06Q 40/12* (2013.12); *H04B 5/0025* (2013.01); *H04M 1/72445* (2021.01); *H04W 4/18* (2013.01); *H04W 4/21* (2018.02); *H04W 8/205* (2013.01); *G06Q 20/10* (2013.01); *G06Q 20/105* (2013.01); *G06Q 40/00* (2013.01); *G07F 7/1008* (2013.01); *H04N 21/812* (2013.01); *H04W 4/02* (2013.01); *H04W 4/029* (2018.02); *H04W 4/80* (2018.02); *H04W 88/02* (2013.01)

(56) References Cited

U.S. PATENT DOCUMENTS

| | | | |
|---|---|---|---|
| 6,115,601 A * | 9/2000 | Ferreira | H04M 17/20 |
| | | | 455/406 |
| 6,123,259 A | 9/2000 | Ogasawara | |
| 6,128,655 A | 10/2000 | Fields | |
| 6,141,666 A | 10/2000 | Tobin | |
| 6,199,082 B1 | 3/2001 | Ferrel | |
| 6,250,557 B1 | 6/2001 | Forslund | |
| 6,415,156 B1 | 7/2002 | Stadelmann | |
| 6,450,407 B1 | 9/2002 | Freeman | |
| 6,587,835 B1 * | 7/2003 | Treyz | H04M 15/8033 |
| | | | 705/14.64 |
| 6,605,120 B1 | 8/2003 | Fields | |
| 6,771,981 B1 | 8/2004 | Zalewski | |
| 6,772,396 B1 | 8/2004 | Cronin | |
| 6,886,017 B1 | 4/2005 | Jackson | |
| 6,950,939 B2 | 9/2005 | Tobin | |
| 7,014,107 B2 | 3/2006 | Singer | |
| 7,031,945 B1 | 4/2006 | Donner | |
| 7,069,248 B2 | 6/2006 | Huber | |
| 7,096,003 B2 | 8/2006 | Joao | |
| 7,110,744 B2 | 9/2006 | Freeny | |
| 7,110,792 B2 * | 9/2006 | Rosenberg | G07F 7/0886 |
| | | | 455/406 |
| 7,127,236 B2 | 10/2006 | Khan | |
| 7,200,578 B2 | 4/2007 | Paltenghe | |
| 7,289,810 B2 | 10/2007 | Jagadeesan | |
| 7,308,254 B1 | 12/2007 | Rissanen | |
| 7,357,312 B2 | 4/2008 | Gangi | |
| 7,379,920 B2 | 5/2008 | Leung | |
| 7,383,226 B2 * | 6/2008 | Kight | G06Q 20/108 |
| | | | 705/40 |
| 7,472,829 B2 | 1/2009 | Brown | |
| 7,482,925 B2 | 1/2009 | Hammad | |
| 7,493,284 B2 | 2/2009 | Celi et al. | |
| 7,512,567 B2 | 3/2009 | Bemmel | |
| 7,522,905 B2 | 4/2009 | Hammad | |
| 7,555,284 B2 * | 6/2009 | Yan | G07F 7/0866 |
| | | | 455/566 |
| 7,680,824 B2 * | 3/2010 | Plastina | G06F 16/433 |
| | | | 715/764 |
| 7,739,596 B2 | 6/2010 | Clarke-Martin | |
| 7,784,684 B2 | 8/2010 | Labrou | |
| 7,792,756 B2 * | 9/2010 | Plastina | H04W 12/64 |
| | | | 707/630 |
| 7,870,077 B2 | 1/2011 | Woo | |
| 7,979,519 B2 | 7/2011 | Shigeta | |
| 8,005,426 B2 * | 8/2011 | Huomo | H04W 12/082 |
| | | | 235/441 |
| 8,019,362 B2 | 9/2011 | Sweatman | |
| 8,073,424 B2 | 12/2011 | Sun | |
| 8,086,534 B2 | 12/2011 | Powell | |
| 8,109,444 B2 | 2/2012 | Jain | |
| 8,121,945 B2 | 2/2012 | Rackley | |
| 8,127,984 B2 * | 3/2012 | Zatloukal | G06K 19/0723 |
| | | | 455/73 |
| 8,467,766 B2 * | 6/2013 | Rackley, III | G06Q 20/3223 |
| | | | 455/406 |
| 8,489,067 B2 * | 7/2013 | Rackley, III | G06Q 20/102 |
| | | | 455/406 |
| 8,510,220 B2 * | 8/2013 | Rackley, III | G06Q 20/102 |
| | | | 705/40 |
| 8,566,239 B2 | 10/2013 | Arthur | |
| 8,693,995 B2 | 4/2014 | Fisher | |
| 8,700,729 B2 * | 4/2014 | Dua | G06Q 20/325 |
| | | | 705/64 |
| 9,294,917 B2 | 3/2016 | Nystrom | |
| 9,996,849 B2 | 6/2018 | Fisher | |
| 10,339,556 B2 | 7/2019 | Fisher | |
| 10,565,575 B2 * | 2/2020 | Fisher | G06Q 30/0268 |
| 10,621,612 B2 | 4/2020 | Fisher | |
| 10,825,007 B2 | 11/2020 | Fisher | |
| 2001/0011250 A1 | 8/2001 | Paltenghe | |
| 2001/0044751 A1 | 11/2001 | Pugliese | |
| 2001/0049636 A1 * | 12/2001 | Hudda | G06Q 30/0601 |
| | | | 705/26.1 |
| 2002/0056091 A1 * | 5/2002 | Bala | G06Q 30/02 |
| | | | 725/23 |
| 2002/0059100 A1 * | 5/2002 | Shore | G06Q 30/0267 |
| | | | 705/14.23 |
| 2002/0063895 A1 | 5/2002 | Agata | |
| 2002/0065774 A1 * | 5/2002 | Young | G06Q 20/326 |
| | | | 705/41 |
| 2002/0077918 A1 | 6/2002 | Lerner | |
| 2002/0082879 A1 | 6/2002 | Miller | |
| 2002/0107756 A1 | 8/2002 | Hammons | |
| 2002/0160761 A1 * | 10/2002 | Wolfe | H04M 3/493 |
| | | | 455/566 |
| 2002/0169984 A1 | 11/2002 | Kumar | |
| 2003/0061113 A1 | 3/2003 | Petrovich | |
| 2003/0065805 A1 | 4/2003 | Barnes | |

(56) References Cited

U.S. PATENT DOCUMENTS

| | | | |
|---|---|---|---|
| 2003/0074259 A1* | 4/2003 | Slyman, Jr. | G06Q 30/0221 705/17 |
| 2003/0085286 A1 | 5/2003 | Kelley | |
| 2003/0087601 A1 | 5/2003 | Agam | |
| 2003/0093695 A1 | 5/2003 | Dutta | |
| 2003/0105641 A1 | 6/2003 | Lewis | |
| 2003/0132298 A1 | 7/2003 | Swartz | |
| 2003/0140004 A1 | 7/2003 | O'Leary | |
| 2003/0149662 A1* | 8/2003 | Shore | G06Q 20/327 705/39 |
| 2003/0163359 A1 | 8/2003 | Kanesaka | |
| 2003/0172028 A1 | 9/2003 | Abell | |
| 2004/0006497 A1 | 1/2004 | Nestor | |
| 2004/0030658 A1* | 2/2004 | Cruz | G07F 17/42 705/65 |
| 2004/0034544 A1 | 2/2004 | Fields | |
| 2004/0064408 A1* | 4/2004 | Kight | G06Q 40/00 705/40 |
| 2004/0073439 A1* | 4/2004 | Shuster | G07C 9/253 726/21 |
| 2004/0073497 A1* | 4/2004 | Hayes | G06Q 30/0601 705/26.1 |
| 2004/0127256 A1* | 7/2004 | Goldthwaite | G06Q 20/32 455/466 |
| 2004/0235450 A1* | 11/2004 | Rosenberg | G16H 10/60 455/406 |
| 2004/0243519 A1 | 12/2004 | Perttila | |
| 2004/0254836 A1 | 12/2004 | Emoke Barabas | |
| 2004/0267618 A1 | 12/2004 | Judicibus | |
| 2004/0267665 A1 | 12/2004 | Nam | |
| 2005/0003810 A1 | 1/2005 | Chu | |
| 2005/0021478 A1* | 1/2005 | Gautier | G06Q 20/12 705/65 |
| 2005/0040230 A1 | 2/2005 | Swartz | |
| 2005/0076210 A1 | 4/2005 | Thomas | |
| 2005/0165646 A1* | 7/2005 | Tedesco | B42D 15/00 705/14.1 |
| 2005/0187873 A1 | 8/2005 | Labrou | |
| 2005/0190970 A1 | 9/2005 | Griffin | |
| 2005/0215231 A1 | 9/2005 | Bauchot | |
| 2005/0240484 A1* | 10/2005 | Yan | G06Q 20/322 455/411 |
| 2006/0000900 A1 | 1/2006 | Fernandes | |
| 2006/0031752 A1* | 2/2006 | Surloff | G06F 3/0213 707/E17.112 |
| 2006/0089874 A1* | 4/2006 | Newman | G06Q 10/10 705/14.32 |
| 2006/0095339 A1* | 5/2006 | Hayashi | G06Q 30/0641 705/26.8 |
| 2006/0123052 A1* | 6/2006 | Robbin | G06Q 30/00 |
| 2006/0143091 A1* | 6/2006 | Yuan | G06Q 30/0601 705/26.1 |
| 2006/0165060 A1* | 7/2006 | Dua | G06Q 20/42 705/76 |
| 2006/0173701 A1* | 8/2006 | Gurvey | G06Q 10/02 705/902 |
| 2006/0191995 A1 | 8/2006 | Stewart | |
| 2006/0206709 A1* | 9/2006 | Labrou | G06Q 20/18 713/167 |
| 2006/0212401 A1* | 9/2006 | Ameerally | G06Q 30/02 705/51 |
| 2006/0219780 A1 | 10/2006 | Swartz | |
| 2006/0235864 A1* | 10/2006 | Hotelling | G06Q 30/0603 |
| 2006/0242267 A1 | 10/2006 | Grossman | |
| 2006/0247976 A1* | 11/2006 | Posokhow | G06Q 30/06 705/26.81 |
| 2006/0248113 A1* | 11/2006 | Leffert | G06Q 40/04 |
| 2006/0248114 A1* | 11/2006 | Anderson | G06Q 30/06 |
| 2006/0294025 A1* | 12/2006 | Mengerink | G06Q 30/0601 705/77 |
| 2007/0004391 A1 | 1/2007 | Maffeis | |
| 2007/0011099 A1* | 1/2007 | Sheehan | G06Q 20/367 705/65 |
| 2007/0022058 A1* | 1/2007 | Labrou | G06Q 20/3272 705/67 |
| 2007/0095892 A1 | 5/2007 | Lyons | |
| 2007/0015060 A1 | 6/2007 | Angelica | |
| 2007/0125838 A1 | 6/2007 | Law | |
| 2007/0125840 A1 | 6/2007 | Law | |
| 2007/0138299 A1 | 6/2007 | Mitra | |
| 2007/0145135 A1 | 6/2007 | Jogand-Coulomb | |
| 2007/0150601 A1* | 6/2007 | Angelica | G06Q 30/02 709/227 |
| 2007/0131759 A1 | 7/2007 | Cox | |
| 2007/0156436 A1 | 7/2007 | Fisher | |
| 2007/0175978 A1* | 8/2007 | Stambaugh | G06Q 40/12 235/379 |
| 2007/0210155 A1 | 9/2007 | Swartz | |
| 2007/0235519 A1 | 10/2007 | Jang | |
| 2007/0235539 A1* | 10/2007 | Sevanto | G07F 7/1008 235/451 |
| 2007/0255662 A1 | 11/2007 | Tumminaro | |
| 2007/0262139 A1 | 11/2007 | Fiebiger | |
| 2007/0266130 A1* | 11/2007 | Mazur | G06Q 20/32 705/26.1 |
| 2007/0270166 A1 | 11/2007 | Hampel | |
| 2007/0288966 A1* | 12/2007 | Javid | H04N 21/4755 348/E7.071 |
| 2007/0293155 A1* | 12/2007 | Liao | G06Q 20/326 455/41.2 |
| 2008/0010190 A1 | 1/2008 | Rackley | |
| 2008/0010196 A1 | 1/2008 | Rackley | |
| 2008/0010215 A1* | 1/2008 | Rackley, III | G06Q 20/108 705/70 |
| 2008/0011825 A1* | 1/2008 | Giordano | G06Q 20/04 235/383 |
| 2008/0017704 A1* | 1/2008 | VanDeburg | G06Q 20/3415 235/380 |
| 2008/0294556 A1 | 1/2008 | Anderson | |
| 2008/0045172 A1 | 2/2008 | Narayanaswami | |
| 2008/0046366 A1* | 2/2008 | Bemmel | G06Q 20/3274 705/44 |
| 2008/0048022 A1 | 2/2008 | Vawter | |
| 2008/0051059 A1 | 2/2008 | Fisher | |
| 2008/0051142 A1 | 2/2008 | Calvet | |
| 2008/0052192 A1 | 2/2008 | Fisher | |
| 2008/0052233 A1 | 2/2008 | Fisher | |
| 2008/0116264 A1 | 5/2008 | Hammad et al. | |
| 2008/0139155 A1 | 6/2008 | Boireau | |
| 2008/0148040 A1* | 6/2008 | Machani | G06F 21/6245 713/193 |
| 2008/0162312 A1* | 7/2008 | Sklovsky | G06Q 40/00 705/1.1 |
| 2008/0167988 A1 | 7/2008 | Sun | |
| 2008/0177668 A1 | 7/2008 | Delean | |
| 2008/0207234 A1* | 8/2008 | Arthur | G06Q 20/322 455/466 |
| 2008/0208681 A1 | 8/2008 | Hammad | |
| 2008/0208743 A1 | 8/2008 | Arthur | |
| 2008/0208744 A1 | 8/2008 | Arthur | |
| 2008/0208762 A1* | 8/2008 | Arthur | G06Q 20/027 705/79 |
| 2008/0221997 A1 | 9/2008 | Wolfe | |
| 2008/0242274 A1* | 10/2008 | Swanburg | H04L 67/306 455/414.1 |
| 2008/0255947 A1 | 10/2008 | Friedman | |
| 2008/0262928 A1* | 10/2008 | Michaelis | G06Q 30/02 705/14.39 |
| 2008/0275779 A1 | 11/2008 | Lakshminarayanan | |
| 2008/0305774 A1 | 12/2008 | Ramakrishna | |
| 2009/0000618 A1 | 1/2009 | Hameen-Anttila | |
| 2009/0061884 A1* | 3/2009 | Rajan | G06Q 30/0225 455/445 |
| 2009/0063312 A1* | 3/2009 | Hurst | G06Q 20/206 705/41 |
| 2009/0075592 A1 | 3/2009 | Nystrom et al. | |
| 2009/0098825 A1 | 4/2009 | Huomo | |
| 2009/0106112 A1 | 4/2009 | Dalmia | |
| 2009/0124234 A1 | 5/2009 | Fisher | |
| 2009/0132362 A1 | 5/2009 | Fisher | |

(56) References Cited

U.S. PATENT DOCUMENTS

| | | | |
|---|---|---|---|
| 2009/0143104 A1* | 6/2009 | Loh | G06Q 20/3278 340/10.1 |
| 2009/0144161 A1 | 6/2009 | Fisher | |
| 2009/0177587 A1* | 7/2009 | Siegal | G06Q 20/10 705/67 |
| 2009/0227281 A1 | 9/2009 | Hammad | |
| 2010/0057619 A1 | 3/2010 | Weller | |
| 2010/0063895 A1* | 3/2010 | Dominguez | G06Q 20/40 705/26.1 |
| 2011/0055038 A1* | 3/2011 | Mengerink | G06Q 20/085 705/26.1 |
| 2011/0320316 A1 | 12/2011 | Randazza | |
| 2012/0030044 A1* | 2/2012 | Hurst | G06Q 20/32 705/16 |
| 2012/0265677 A1* | 10/2012 | Rackley, III | G06Q 30/06 705/41 |
| 2013/0013501 A1* | 1/2013 | Rackley, III | G06Q 20/10 705/41 |
| 2015/0012440 A1 | 1/2015 | Kelley | |

OTHER PUBLICATIONS

Wikipedia NFC https://en.wikipedia.org/wiki/Near-field_communication.
U.S. Appl. No. 16/389,925, Notice of Allowance dated Dec. 31, 2019, 8 p.
U.S. Appl. No. 15/175,150, Notice of Allowance dated Apr. 5, 2017, 5 p.
U.S. Appl. No. 11/933,367, Office Action dated May 27, 2010, 8 p.
U.S. Appl. No. 14/686,695, Notice of Allowance dated Oct. 12, 2017, 11 p.
1739369(MasterCard PayPass.pdf athttps://www.google.co.kr/search?q=MasterCard.+PayPass+Mag+Stripe%2C+Acquirer+Implementation+Requirements&newwindow=1&biw=1851&bih=973&source=lnt&tbs=cdr%3A1%2Ccd_min%3A%2Ccd_max%3A8%2F24%2F2006&tbm=#newwindow=1&tbs=cdr:1,cd_max:8/24/2006&q=MasterCard%C2%AEPayPass%E2%84%A2+mag+stripe,+acquirer+Implementation+requirements&spf=1495411706977.
"Is near-field communication close to success?" article dated Mar. 2006 at http://ieeexplore.ieee.org/document/1607943/.
"Room6_150pm_munro.pdf" at http://www.rfidjournal.net/live05/monday/.
Wikipedia Infrared https://en.wikipedia.org/wiki/infrared_Data_Association.
Wikiepedia Bluetooth http://nearfieldcommunication.org/bluetooth.html.
Wikipedia NFC https://en.wikipedia.org/wiki/Near-field_communicatian.
RF wireless comparison of NFC vs RFID http://www.rfwireless-world.com/Terminology/NFC-vs-RFID-vs-Bluetooth-vs-wifi.html.
IPR2021-01569.
IPR2021-01570.
IPR2021-01571.
IPR2021-01529.
IPR2021-01530.

* cited by examiner

BLAZE NFC MOBILE PAYMENTS

CROSS-REFERENCE TO RELATED APPLICATIONS

This application is a continuation of application Ser. No. 17/084,538 filed Oct. 29, 2020 titled "ACQUIRING AN IDENTIFICATION CODE ASSOCIATED WITH A USER IN AN NFC TRANSACTION" which is a continuation and claims priority to application Ser. No. 14/253,648, filed Apr. 15, 2014 titled "REMOTE TRANSACTION PROCESSING OF AT A TRANSACTION SERVER" now U.S. Pat. No. 10,825,007 issued on Nov. 3, 2020 which is a continuation and claims priority to application Ser. No. 13/736,056, filed Jan. 7, 2013, titled "REMOTE TRANSACTION PROCESSING USING A DEFAULT PAYMENT METHOD" now U.S. Pat. No. 8,694,380 issued on Apr. 8, 2014 which is a continuation and claims priority to application Ser. No. 11/948,903, filed Nov. 30, 2007, titled "METHOD AND SYSTEM FOR CONDUCTING AN ONLINE PAYMENT TRANSACTION USING A MOBILE COMMUNICATION DEVICE", now U.S. Pat. No. 8,352,323 issued on Jan. 8, 2013 all of which are incorporated by reference herein in their entirety.

FIELD OF INVENTION

The present invention relates to data communications and wireless devices.

BACKGROUND OF THE INVENTION

Mobile communication devices—e.g., cellular phones, personal digital assistants, and the like—are increasingly being used to conduct payment transactions as described in U.S. patent application Ser. No. 11/933,351, entitled "Method and System For Scheduling A Banking Transaction Through A Mobile Communication Device", and U.S. patent application Ser. No. 11/467,441, entitled "Method and Apparatus For Completing A Transaction Using A Wireless Mobile Communication Channel and Another Communication Channel", both of which are incorporated herein by reference. Such payment transactions can include, for example, purchasing goods and/or services, bill payments, and transferring funds between bank accounts.

BRIEF SUMMARY OF THE INVENTION

In general, this specification describes a method and system for conducting an online payment transaction through a point of sale device. The method includes receiving input from a user selecting an item for purchase through the point of sale device; calculating a total purchase amount for the item in response to a request from the user to purchase the item; and sending payment authorization for the total purchase amount from the point of sale device to a payment entity, in which the payment authorization is sent to the payment entity via a mobile communication device of the user. The method further includes receiving a result of the payment authorization from the payment entity through the mobile communication device; and completing the payment transaction based on the result of the payment authorization.

Particular implementations can include one or more of the following features. The point of sale device ran be a desktop computer, a laptop computer, or a terminal. The mobile communication device can be a cellular phone, a wireless personal digital assistant (PDA), or a laptop computer. The cellular phone can be an NFC-enabled phone. Sending payment authorization for the total purchase amount from the point of sale device to a payment entity can include sending the payment authorization securely to the payment entity. The payment entity can be a person, a computer system, or a bank. The method can further include maintaining a shopping list on the mobile communication device of the user, in which the shopping list includes a listing of one or more items to be purchased by the user. The payment authorization can be an authorization for payment with a credit card, a debit card, or a prepaid card.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

Figure 1:
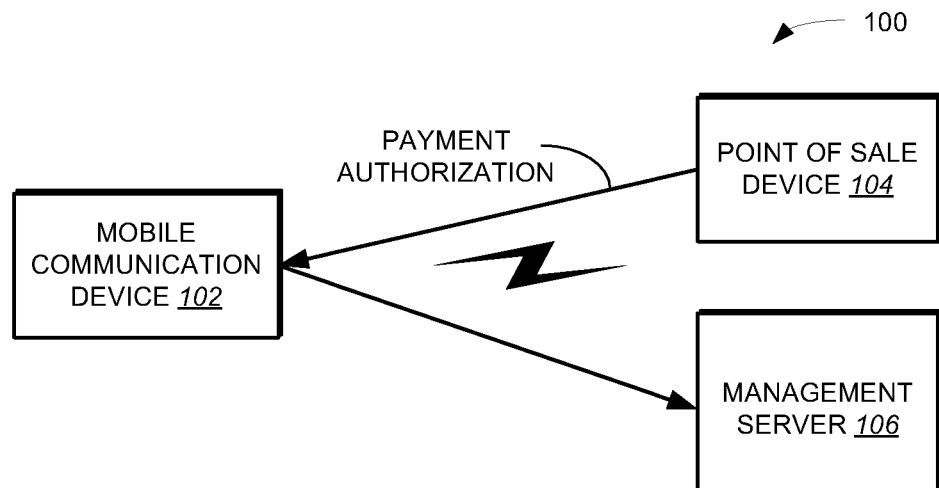
FIG. 1 illustrates a block diagram of a communication system including a wireless mobile communication device and a management server in accordance with one implementation.

FIG. 1 illustrates one implementation of a communication system 100. The communication system 100 includes a hand-held, wireless mobile communication device 102 a point-of-sale device 104 and a management server 106. In one implementation, the mobile communication device 102 includes a mobile application (discussed in greater detail below) that permits a user of the mobile communication device 102 to conduct payment transactions, Payment transactions can include, for example, using contactless payment technology at a retail merchant point of sale (e.g., through point of sale device 104), using mobile/internet commerce (e.g., purchase tickets and products, etc.), storage of payment information and other digital artifacts (e,g., receipts, tickets, coupons, etc.), storage of banking information (payment account numbers, security codes, PIN's, etc.), and accessing banking service (account balance, payment history, bill pay, fund transfer, etc.), and so on. The mobile communication device 102 can be a cellular phone, a wireless personal digital assistant (PDA), a laptop computer, or other wireless communication device. The point of sale device 104 can be a desktop computer, laptop computer, terminal, or other device that is configured to receive user input selecting items for purchase or other transaction.

In one implementation, authorizations for payment transactions that are made through the point of sale device 104 are sent from the point of sale device 104 to an issuer authorization (e.g., management server 106) through the mobile communication device 102 (as shown in FIG. 1). In one implementation, an issuer authorization is a payment entity that either approves or disapproves a payment transaction. An issuer authorization can be, e.g., a person, computer system, bank (or other third party). One potential benefit of having payment authorizations flow through the mobile communication device 102 is that sensitive user information (e.g. account numbers, pin numbers, and/or identity information) need only be sent from the mobile communication device 102 directly to an issuer authorization. Such operation reduces the potential for identity theft and/or fraudulent purchases made through a point of sale device. For example, (in one implementation) payment authorizations cannot be sent to an issuer authorization if the mobile communication device 102 is turned off.

Figure 2:
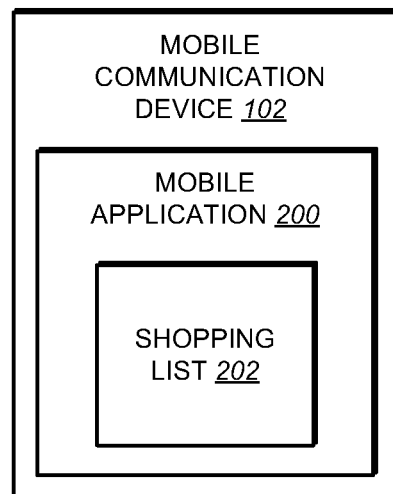
FIG. 2 illustrates one implementation of the wireless mobile communication device of FIG. 1.

FIG. 2 illustrates one implementation of the mobile communication device 102. The mobile communication device 1.02 includes a mobile application 200 that (in one implementation) is provided to the mobile communication device 102 through a remote server (e.g., management server 106). In one implementation, the mobile application is a Mobile Wallet application available from Mobile Candy Dish, Inc., of Alameda, Calif. In one implementation, the mobile application is a hosted service, as described in U.S. patent application Ser. No. 11/939,821, entitled "Method and System For Securing Transactions Made Through a Mobile Communication Device", which is incorporated herein by reference. In one implementation, the mobile application 200 is configured to send requests to the management server for artifacts based on user input, e.g., received though a keypad (not shown) of the mobile communication device 102. Requests to the management server 106 can also be automated, via proximity-based services, e.g., consumer tapping (or in close proximity) an LBS/contactless/RFID enabled phone against a smart poster (RFID/Bluetooth/LBS enabled, etc.), kiosk, or other device.

In one implementation, the mobile application 200 running on the mobile communication device 102 is configured to receive artifacts (e.g., advertisements, receipts, tickets, coupons, media, content, and so on) from the management server 106. In one implementation, the management server 106 sends artifacts to the mobile application based on user profile information and/or a transaction history (or payment trends) associated with a user of the mobile communication device 102 as described in U.S. patent application Ser. No. 11/944,267, entitled "Method and System For Delivering Information To a Mobile Communication Device Based On Consumer Transactions", which is incorporated herein by reference.

In one implementation, the mobile communication device 102 is an NFC-enabled phone. The mobile communication device 102 can be NFC-enabled, for example, through an embedded chip or a sticker that is affixed to the cellular phone, as described in U.S. application Ser. No. 11/933,321, entitled "Method and System For Adapting a Wireless Mobile Communication Device For Wireless Transactions", which is incorporated herein by reference. In one implementation, the NFC chip (or sticker) on the cellular phone can be used in conjunction with a merchant's point of sale device as described in greater detail below.

Figure 4:
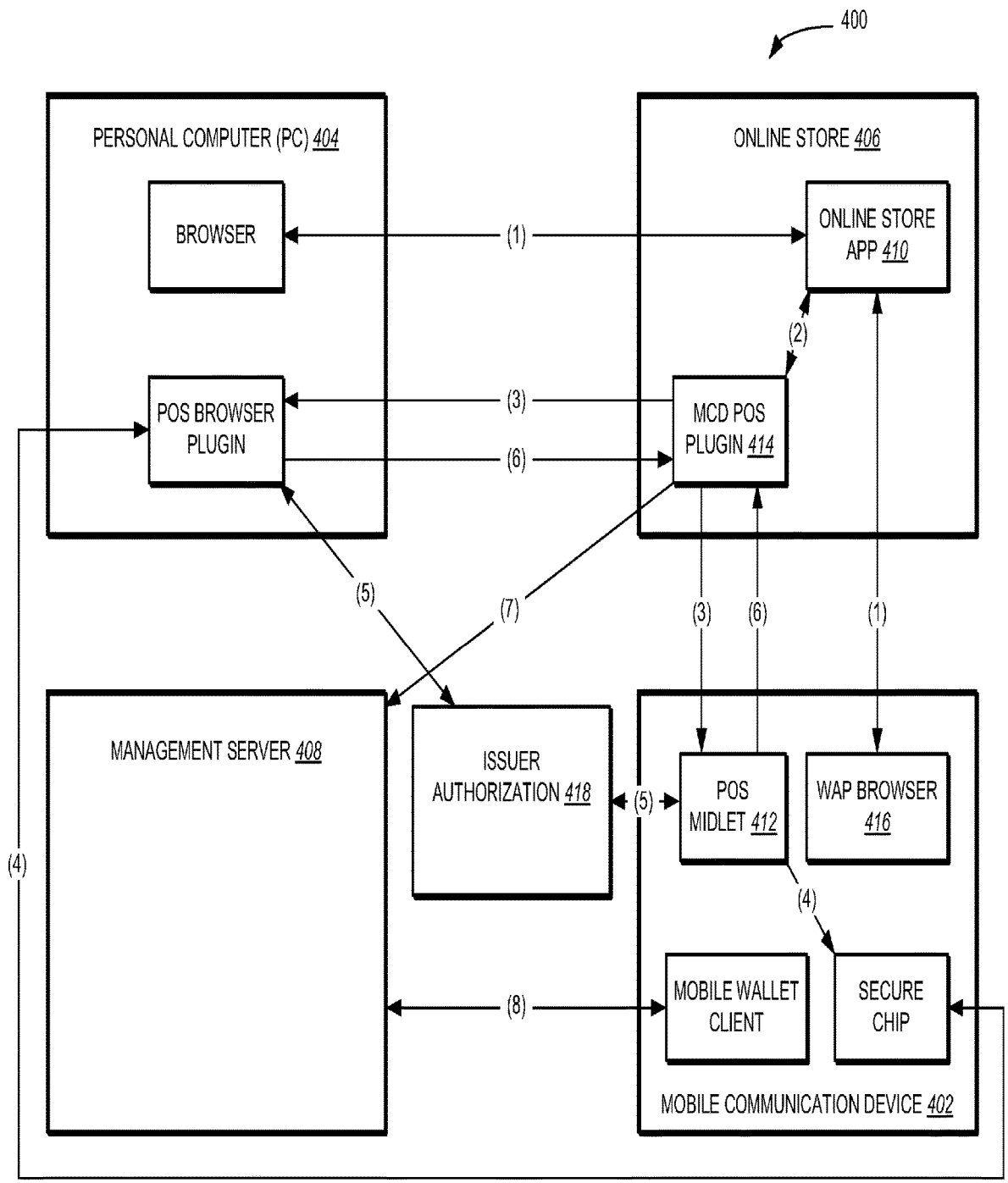
FIG. 4 illustrates a block diagram of a communication system including a wireless mobile communication device and an online store in accordance with one implementation.

For example, with reference to FIG. 4, in one implementation, the NFC chip (or sticker) on the cellular phone can communicate with NFC chips that are installed on the front of PC's (TV's, Kiosks, or any other device) and serve as scanners/readers. In this implementation a mobile candy dish applet (e.g., MCD POS plugin. 414) is installed on the consumer's computer (e.g., PC 404) which interfaces with the NFC chip on the PC. When a consumer (or user) is shopping online and they are ready to pay for their products, the consumer opens his mobile wallet and selects one of the payment methods (e.g., credit card debit card, prepaid card, etc.) from their mobile wallet. If a default card has been selected already, this step is not necessary. The consumer then waves their phone over the NFC reader present on the PC 404. The consumer's payment credentials are transferred from the phone to the merchant website (e.g., online store application 410) using a communication protocol between the chip in the phone and the chip in the which can be radio frequency for example. If the consumer has coupons in their mobile wallet the consumer can either elect to manually apply the coupon, save the coupon for a future use (against a larger purchase for example), or have the coupon automatically applied during the transaction and the transaction amount is updated. After the consumer enters any necessary validation information (e.g., pin) to provide a multi-factor authentication and confirms the transaction, the online purchase is processed as normal by the merchant's online processor. The mobile wallet can retrieve transaction data, account balance from the management server 408.

In one implementation, the mobile communication device 102 is a non NFC-enabled phone. In this implementation, the consumer connects his phone to the PC 404 via some non radio frequency method (e.g., IR, Bluetooth, USB cable, etc.). When a consumer is shopping online and they are ready to pay for their products, the consumer opens his mobile wallet and selects one of the payment methods (e.g., credit card, debit card, prepaid card, etc.) from their mobile wallet. If a default card has been selected already, this step is not necessary. The consumer then pushes, e.g., a "Buy now" button and the consumer's payment credentials are transferred from the phone to the merchant website (e.g., online store application 410) using the protocol between the phone and the PC 404 which can be radio frequency, for example. If the consumer has coupons in their mobile wallet the consumer can either elect to manually apply the coupon, save the coupon for a future use, or have the coupon automatically applied during the transaction and the transaction amount is updated. After the consumer enters any necessary validation information. (e.g., pin) to provide multi-factor authentication and confirms the transaction, the online purchase is processed as normal by the merchant's online processor. The mobile wallet can retrieve transaction data and account balance from the management server 408.

In one implementation, the management server 408 and merchant portal (e.g., online store 408) are maintained by trusted parties and use an encrypted tunnel to transfer financial data. When the consumer is ready to pay for their online product, they enter their cell phone number on the merchant portal. The merchant portal (which has an MCD applet (e.g., MCD POS plugin 414) installed on its server) securely connects to the management server 408 (that in one implementation is maintained by Mobile Candy Dish (MCD)). In one implementation, the management server 408 identifies the consumer through their cell phone number, and verifies the consumer's authenticity by sending a unique transaction code to the consumer mobile wallet on their cell phone. The consumer then enters this unique transaction code onto the merchant's web portal. The merchant portal sends this transaction number to the management server 408 for authentication. Upon authentication, the consumer's virtual wallet and payment methods (e.g., credit card, debit card, prepaid card, etc.) are securely retrieved from the management server 408 and are displayed to the consumer in a window on a website associated with the merchant portal. The consumer selects one of these payment methods to pay for their transaction. If a default card has been selected already, this step is not necessary. If the consumer has coupons in their mobile wallet the consumer can either elect to manually apply the coupon, save the coupon for a future use, or have the coupon automatically applied during the transaction and the transaction amount is updated. After the consumer enters any necessary validation information to provide a multi-factor authentication and confirms the transaction, the online purchase is processed as normal by the merchant's online processor. The mobile wallet can retrieve transaction data, account balance from the management server 408.

Referring to FIG. 2, in one implementation, the mobile application 200 maintains a shopping list 202 for a consumer. Accordingly, consumers have the ability to store their shopping list in their mobile wallet and add, delete, or change items on their shopping list either in offline or online mode. In one implementation, consumers are sent coupons based on items on their shopping list, preferences, previous shopping history, proximity to the physical retail store, or a combination of these parameters, as discussed in application Ser. No. 11/944,267, which is incorporated by reference above. If the consumer has coupons in their mobile wallet the consumer can either elect to manually apply the coupon, save the coupon for a future use, or have the coupon automatically applied during the transaction and the transaction amount is updated. When a consumer wants to order the items on their shopping list via an on online merchant (in contrast to a physical retail store), the consumer can logon to the merchant portal and electronically transmit their shopping list to the merchant portal either by waving their phone over NFC enabled PC's or some other connection such as IR, bluetooth, USB, or the like.

Figure 3:
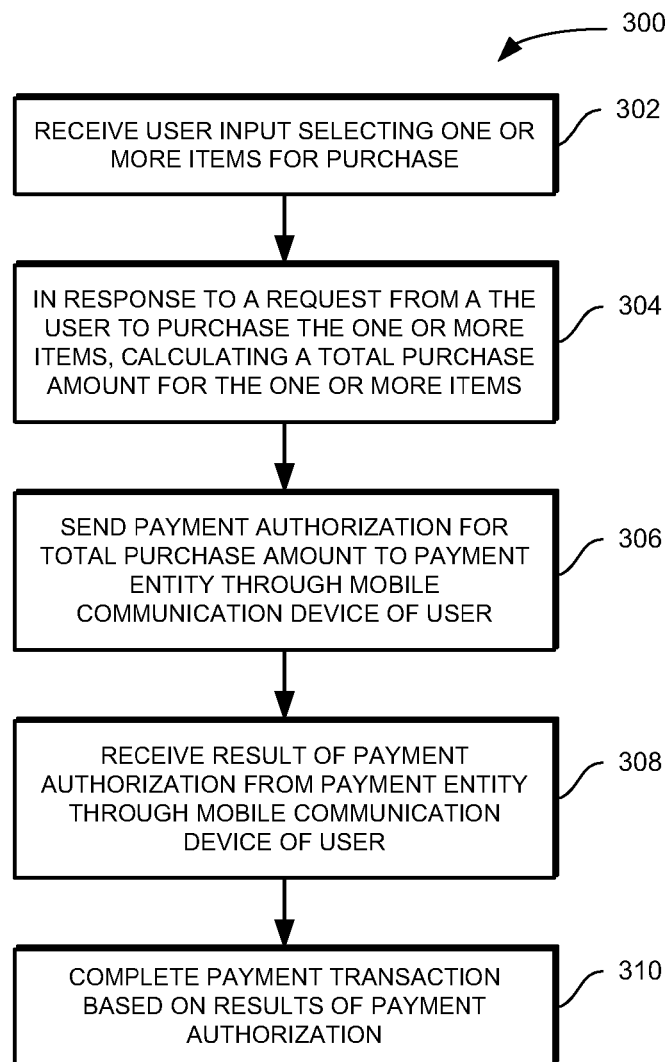
FIG. 3 is a method for conducting a payment transaction using a point of sale device in accordance with one implementation.

FIG. 3 illustrates a method 300 for conducting a payment transaction using a point of sale device (e.g., point of sale device 104). User input is received selecting one or more items for purchase (e,g., at the point of sale device) (step 302). In general, the transaction being made at the point of sale device can be any type of transaction that involves the exchange or transfer of funds—e.g., the transaction can be a payment transaction, a fund transfer, or other type of transaction. In response to a request from the user to purchase the one or more items, a total purchase amount for the one or more items is calculated (e.g., by the point of sale device) (step 304). If the user has coupons in their mobile wallet the user can either manually apply the coupon or have the coupon automatically applied during the transaction and the transaction amount is updated. The user request to purchase an item can be received, e.g., by a user clicking on a "buy now" icon that is displayed on a graphical user interface of the point of sale device. Payment authorization for the total purchase amount is sent to a payment entity through a mobile communication device of the user (step 306). A result of the payment authorization is received at the point of sale device from the payment entity via the mobile communication device (step 308). The payment transaction is completed based on the result of the payment authorization (step 310). If the payment transaction was authorized by the payment entity, then the sale of the items through the point of sale device is completed. Otherwise, if the payment transaction was not authorized by the payment entity, then the point of sale device terminates the payment transaction.

FIG. 4 illustrates an example payment transaction being made in a communication system 400 in accordance with one implementation. The communication system 400 includes a mobile communication device 402, a personal computer (PC) 404, an online store 406, and a core (or datastore) 408. As indicated by interaction (1), a user (or customer), using a phone (e.g., mobile communication device 402 or personal computer 404), browses an online store website (online store application 410) and finds an item that the customer wishes to purchase. This could also be a purchase made through a midlet application (PUS midlet 412) residing on the mobile communication device 402. The user then goes to, e.g., a checkout of the online store 406 make a purchase. If the user has coupons in their mobile wallet the user can either manually apply the coupon or have the coupon automatically applied during the transaction and the transaction amount is updated. When it comes time to authorize the purchase, (in one implementation) the user is given an option to purchase with the mobile communication device 402. In one implementation, the mobile communication device 402 is an NFC-equipped phone (or NFC phone).

In interaction (2), when the user chooses to purchase with the mobile communication device 402, the online store application 410 sends the transaction information for authorization to the POS vendor plugin (e.g., MCD POS plugin 414). In one implementation, the POS vendor plugin is installed in the merchant's online store and enables the merchant to accepts MCD Blaze payments as an alternative form of payment, similar to accepting credit cards for payment. As shown by interaction (3), the POS vendor plugin formats, encrypts, and cryptographically signs the purchase authorization request which is sent via a secure SSL link (e.g., HTTPs, Bluetooth, IR, USB, or other suitable protocol) established by the browser/web application 416 back to the mobile communication device 402. As with the first scenario, all communications is over secure channels. (It may be required that the mobile wallet application be opened prior to beginning a phone online purchase.) The POS midlet 412 is a component of the mobile wallet application that executes PayPass or other payment authorization protocol between itself and the SE payment applications on the mobile communication device 402 (interaction (4)). The results of the request are sent back to the POS vendor plugin.

As shown by interaction (5), the POS midlet 412 then forwards the properly formatted authorization request to a payment entity (e.g., issuer authorization 418) for authorization. The results of the request are then sent back to the POS component of the mobile wallet. Through interaction (6), the POS midlet 412 then forwards the results back to the MCD POS plugin 414 to complete the purchase. The MCD POS plugin 414 then forwards the purchase transaction information to the management server 408 for later customer viewing (interaction (7)). As indicated by interaction (8), users (or customers) will then be able to query the management server 408 and immediately obtain purchase information, either by phone or PC.

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (RUM), a rigid magnetic disk and an optical disk. Current examples of optical disks include compact disk-read only memory (CD-ROM), compact disk read/write (CD-RIW) and DVD.

Figure 5:
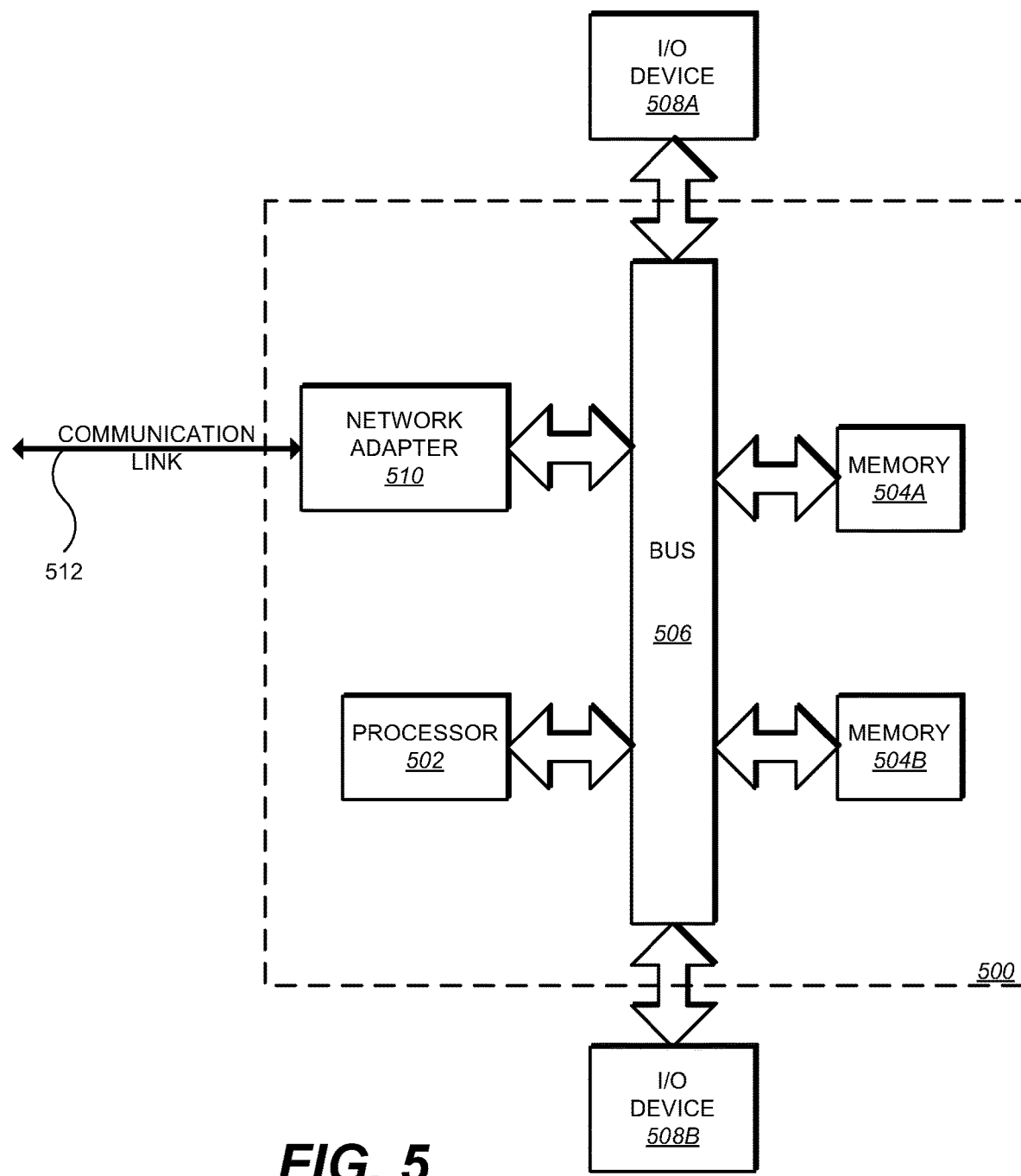
FIG. 5 is a block diagram of a data processing system suitable for storing and/or executing program code in accordance with one implementation.

FIG. 5 illustrates a data processing system 500 suitable for storing and/or executing program code. Data processing system 500 includes a processor 502 coupled to memory elements 504A-B through a system bus 506. In other implementations, data processing system 500 may include more than one processor and each processor may be coupled directly or indirectly to one or more memory elements through a system bus. Memory elements 504A-B can include local memory employed during actual execution of the program code, bulk storage, and cache memories that provide temporary storage of at least some program code in order to reduce the number of times the code must be retrieved from bulk storage during execution. As shown, input/output or I/O devices 508A-B (including, but not limited to, keyboards, displays, pointing devices, etc.) are coupled to data processing system 500. I/O devices 508A-B may be coupled to data processing system 500 directly or indirectly through intervening I/O controllers (not shown).

In one implementation, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

Although the present invention has been particularly described with reference to implementations discussed above, various changes, modifications and substitutes are can be made. Accordingly, it will be appreciated that in numerous instances some features of the invention can be employed without a corresponding use of other features. Further, variations can be made in the number and arrangement of components illustrated in the figures discussed above.

What is claimed is:

1. A method for conducting a Near Field Communication (NFC) payment transaction using an NFC protocol, the method comprising:

maintaining a non-browser based application in a mobile device memory, wherein the non-browser based application is a mobile operating system platform non-browser based mobile application with a graphical user interface that is preinstalled or downloaded and installed on the mobile device, the mobile device comprising the mobile device memory, a mobile device display, a mobile device processor, a mobile device wireless transceiver that supports voice and data interactions through a first communication channel, an NFC transceiver configured to use the NFC protocol through a second communication channel, an NFC processor configured to use the NFC protocol, and a secure element memory, wherein the secure element memory maintains a secure element application configured to use the NFC protocol and maintains an identification code associated with a user, wherein the secure element memory, NFC transceiver, and NFC processor are included in a secure element permanently embedded within a body of the mobile device, wherein the graphical user interface includes a graphical icon;

executing the secure element application by the NFC processor in response to a detection of a near field communication inductive signal from an NFC terminal configured to use the NFC protocol; and transmitting, using the secure element application, via the NFC transceiver, first transaction information including the identification code associated with the user via the second communication channel from the secure element memory to the NFC terminal during an NFC inductive interaction between the secure element and the NFC terminal, wherein the first transaction information including the identification code associated with the user is transmitted from the NFC terminal to a remote server that processes the NFC payment transaction using a payment method that corresponds to the identification code associated with the user, wherein the payment method is maintained at the remote server, wherein the second communication channel is different than the first communication channel; and after the NFC payment transaction has been processed, receiving, at the mobile device, from the remote server over the first communication channel a digital artifact for display in the graphical user interface of the non-browser based application.

2. The method of claim 1, wherein the payment method is a credit card, debit card, or prepaid card.

3. The method of claim 1, wherein no sensitive information is stored on the mobile device.

4. The method of claim 3, wherein the sensitive information comprises at least one of information related to the payment method or information related to the expiration date associated with the payment method.

5. The method of claim 1, further wherein based on information related to the identification code associated with the user, the NFC terminal transmits the identification code associated with the user to the remote server for processing the NFC payment transaction using the payment method maintained at the remote server that corresponds to the identification code associated with the user.

6. The method of claim 1, further wherein, the digital artifact is based on the remote server correlating the identification code associated with the user, information related to the payment method, information related to the user, information related to the NFC payment transaction, and information related to a transaction history of the user.

7. The method of claim 1, further wherein the remote server is configured to store a single userID for a plurality of the user's mobile devices and further wherein the configuration means the remote server scales.

8. The method of claim 1, further wherein the non-browser based application generates an alert if it has not received the digital artifact from the remote server over the first communication channel within a certain period of time.

9. The method of claim 1, further wherein the digital artifact comprises an advertisement, receipt, ticket, coupon, media, content, and transaction status.

10. The method of claim 1, further wherein upon a condition that the mobile device loses connection with a wireless network the non-browser based application monitors for access to the wireless network and automatically re-connects to the wireless network when the wireless network is available.

11. The method of claim 1, further wherein the non-browser based application sends a request to the remote server to retransmit the digital artifact if it has not received the digital artifact from the remote server within a certain period of time.

12. The method of claim 1, further wherein the non-browser based application receives the digital artifact through a connection of the mobile device to a wireless network;
the non-browser based application displays the digital artifact while the mobile device maintains the connection to the wireless network; and
the method further comprises:
losing the connection of the mobile device to the wireless network while the non-browser based application displays the digital artifact; and
after losing the connection, continuing to display the digital artifact within the non-browser based application.

13. The method of claim 1, further wherein the payment method is maintained at the remote server improves security.

14. The method of claim 1, further wherein the digital artifact is stored in the mobile device memory due to improve the mobile device performance, mobile device usability, user experience, and user convenience.

15. The method of claim 1, further wherein the non-browser based application is stored in a local mobile device memory during an execution of the non-browser based application, a bulk storage mobile device memory when the non-browser based application is not being executed, and a cache mobile device memory to provide temporary storage of at least some of the non-browser based application in order to reduce the number of times the non-browser based application must be retrieved from the bulk storage mobile device memory during the execution.

16. A mobile device for conducting a Near Field Communication (NFC) payment transaction using an NFC protocol, the mobile device comprising:
a mobile device memory maintaining a non-browser based application, wherein the non-browser based application is a mobile operating system platform non-browser based mobile application with a graphical user interface that is preinstalled or downloaded and installed on the mobile device, wherein the graphical user interface includes a graphical icon;
a mobile device wireless transceiver that supports voice and data interactions through a first communication channel;
a mobile device processor that receives from the remote server over the first communication channel a digital artifact for display in the graphical user interface of the non-browser based application;
a secure element permanently embedded within the body of the mobile device comprising:
a secure element memory that maintains a secure element application configured to use the NFC protocol and maintains an identification code associated with a user that is executed in response to a detection of a near field communication inductive signal from an NFC terminal configured to use the NFC protocol; and
an NFC transceiver configured to use the NFC protocol that transmits, the first transaction information including the identification code associated with the user through a second communication channel to the NFC terminal while using the secure element application, during an NFC inductive interaction between the secure element and the NFC terminal, and further wherein the first transaction information including the identification code associated with the user is transmitted from the NFC terminal to a remote server which processes the NFC payment transaction using a payment method that corresponds to the identification code associated with the user; wherein the payment method is maintained at the remote server, wherein the second communication channel is different than the first communication channel.

17. The mobile device of claim 16, wherein the payment method is a credit card, debit card, or prepaid card.

18. The mobile device of claim 16, wherein no sensitive information is stored on the mobile device.

19. The mobile device of claim 18, wherein the sensitive information comprises at least one of information related to the payment method or information related to the expiration date associated with the payment method.

20. The mobile device of claim 16, further wherein based on information related to the identification code associated with the user, the NFC terminal transmits the identification code associated with the user to the remote server for processing the NFC payment transaction using the payment method maintained at the remote server that corresponds to the identification code associated with the user.

21. The mobile device of claim 16, further wherein, the digital artifact is based on the remote server correlating the identification code associated with the user, information related to the payment method, information related to the user, information related to the NFC payment transaction, and information related to a transaction history of the user.

22. The mobile device of claim 16, further wherein the remote server is configured to store a single userID for a plurality of the user's mobile devices and further wherein the configuration means the remote server scales.

23. The mobile device of claim 16, further wherein the non-browser based application generates an alert if it has not received the digital artifact from the remote server over the first communication channel within a certain period of time.

24. The mobile device of claim 16, further wherein the digital artifact comprises an advertisement, receipt, ticket, coupon, media, content, and transaction status.

25. The mobile device of claim 16, further wherein upon a condition that the mobile device loses connection with a wireless network the non-browser based application monitors for access to the wireless network and automatically re-connects to the wireless network when the wireless network is available.

26. The mobile device of claim 16further wherein the non-browser based application sends a request to the remote server to retransmit the digital artifact if it has not received the digital artifact from the remote server within a certain period of time.

27. The mobile device of claim 16, further wherein the non-browser based application receives the digital artifact through a connection of the mobile device to a wireless network;
the non-browser based application displays the digital artifact while the mobile device maintains the connection to the wireless network; and
the method further comprises:
losing the connection of the mobile device to the wireless network while the non-browser based application displays the digital artifact; and after losing the connection, continuing to display the digital artifact within the non-browser based application.

28. The mobile device of claim 16, further wherein the payment method is maintained at the remote server improves security.

29. The mobile device of claim 16, further wherein the digital artifact is stored in the mobile device memory due to reasons of mobile device performance, mobile device usability, user experience, and user convenience.

30. The mobile device of claim 16, further wherein the non-browser based application is stored in a local mobile device memory during an execution of the non-browser based application, a bulk storage mobile device memory when the non-browser based application is not being executed, and a cache mobile device memory to provide temporary storage of at least some of the non-browser based application in order to reduce the number of times the non-browser based application must be retrieved from the bulk storage mobile device memory during the execution.

* * * * *